United States Patent [19]

Lesko et al.

[11] Patent Number: 5,412,041
[45] Date of Patent: May 2, 1995

[54] METHOD FOR FORMING (METH)ACROLEIN-CONTAINING POLYMERS

[75] Inventors: Patricia M. Lesko, Ottsville, Pa.; Ronald Fairhurst, Whitley Bay, United Kingdom

[73] Assignee: Rohm and Haas Company, Philadelphia, Pa.

[21] Appl. No.: 273,259

[22] Filed: Jul. 11, 1994

[51] Int. Cl.⁶ .................................................. C08F 8/12
[52] U.S. Cl. ................................. 525/340; 525/327.2; 525/353; 525/355; 525/386
[58] Field of Search ................. 525/340, 353, 355, 386

[56] References Cited

U.S. PATENT DOCUMENTS

| | | |
|---|---|---|
| 3,455,861 | 7/1969 | Bresciani et al. |
| 3,896,085 | 7/1975 | Larsson et al. |
| 4,851,583 | 6/1989 | Bockowski et al. ................. 568/465 |
| 5,079,266 | 1/1992 | Bockowski et al. ................. 504/161 |
| 5,176,975 | 1/1993 | Kato et al. ........................... 430/49 |

*Primary Examiner*—Bernard Lipman

[57] ABSTRACT

A method is disclosed for forming emulsion copolymers of (meth)acrolein by:

(1) emulsion polymerizing from about 0.1% to about 25%, by weight, based on the total weight of the copolymer, of an acetal derivative of (meth)acrolein with from about 75% to about 99.9% by weight, based on the total weight of the copolymer, of at least one α,β-ethylenically unsaturated comonomer; and (2) adjusting the pH of the copolymer to less than about 5 to hydrolyze the acetal derivative of (meth)acrolein to (meth)acrolein.

The emulsion copolymers of (meth)acrolein formed by the method of the present invention demonstrate performance properties equivalent to those formed by conventional polymerization techniques without the attendant safety and health concerns while handling and transporting the monomer.

3 Claims, No Drawings

METHOD FOR FORMING (METH)ACROLEIN-CONTAINING POLYMERS

FIELD OF THE INVENTION

This invention relates to an improved method of forming emulsion copolymers of acrolein and methacrolein (referred to herein collectively as "(meth)acrolein"), and more particularly, to an improved method of forming emulsion copolymers of (meth)acrolein using acetals of (meth)acrolein.

BACKGROUND OF THE INVENTION

Emulsion copolymers of (meth)acrolein, such as those described in U.S. Pat. Nos. 3,455,861 and 3,896,085, are formed directly from the free radical polymerization of (meth)acrolein monomer with the other comonomers used to form the copolymers. (Meth)acrolein monomer, however, presents serious health and safety hazards during transportation and handling, including high flammability, volatility and toxicity (severe eye and skin irritation).

According, it is desirable to form emulsion copolymers of (meth)acrolein while minimizing these attendant safety and health problems. I have discovered that by replacing the (meth)acrolein monomer with an acetal derivative of (meth)acrolein in the free radical polymerization and adjusting to an acid pH to hydrolyze the acetal derivative of (meth)acrolein to (meth)acrolein, I am able to eliminate or greatly reduce the safety and health problems associated with transporting and handling (meth)acrolein monomer without detrimentally affecting the performance properties the final copolymer.

SUMMARY OF THE INVENTION

This invention is directed to a method for forming emulsion copolymers of (meth)acrolein by:

(1) emulsion polymerizing from about 0.1% to about 25%, by weight, based on the total weight of the copolymer, of an acetal derivative of (meth)acrolein with from about 75% to about 99.9% by weight, based on the total weight of the copolymer, of at least one $\alpha,\beta$-ethylenically unsaturated comonomer; and (2) adjusting the pH of the copolymer to less than about 5 to hydrolyze the acetal derivative of (meth)acrolein to (meth)acrolein.

The emulsion copolymers of (meth)acrolein formed by the method of the present invention demonstrate performance properties equivalent to those formed by conventional polymerization techniques without the attendant safety and health concerns while handling and transporting the monomer.

DESCRIPTION OF THE INVENTION

The present invention involves a method for forming aqueous emulsion copolymers of (meth)acrolein by:

(1) emulsion polymerizing from about 0.1% to about 25%, by weight, based on the total weight of the copolymer, of an acetal of (meth)acrolein with from about 75% to about 99.9% by weight, based on the total weight of the copolymer, of at least one $\alpha,\beta$-ethylenically unsaturated comonomer; and (2) adjusting the pH of the copolymer to less than about 5 to hydrolyze the acetal derivative of (meth)acrolein to (meth)acrolein.

Emulsion Polymerization

The first step of the present invention is copolymerizing from about 0.1% to about 25%, by weight, based on the total weight of the copolymer, of an acetal derivative of (meth)acrolein with from about 75% to about 99.9% by weight, based on the total weight of the copolymer, of at least one $\alpha,\beta$-ethylenically unsaturated comonomer. Preferably, the acetal of (meth)acrolein is copolymerized at a level of from about 0.1% to about 25%, by weight and, most preferably, at a level of from about 0.1% to about 4%, based on the total weight of the copolymer.

Suitable acetal derivatives of acrolein useful in the method of the invention include, but are not limited to, 2-vinyl-1,3-dioxolane (2-VD) (ethylene acetal of acrolein), 2-vinyl-4-methyl-1,3 dioxolane (propylene acetal of acrolein), 3,3-dimethoxy-1-propene (dimethyl acetal of acrolein), 3,3-diethoxy-1-propene (diethyl acetal of acrolein). The preferred acetal derivatives of acrolein is 2-vinyl-1,3-dioxolane. Suitable acetal derivative of methacrolein useful in the method of the invention include 3,3-diethoxy-2-methyl-1-propene, 2-isopropenyl-1,3-dioxolane, 2-isopropenyl-4-methyl-1,3-dioxolane.

Suitable $\alpha,\beta$-ethylenically unsaturated comonomers useful in the method of this invention include, but are not limited to, monoethylenically unsaturated monomers containing acid-functionality such as monomers containing at least one carboxylic acid group including acrylic acid and methacrylic acid, acryloxypropionic acid, (meth)acryloxypropionic acid, itaconic acid, aconitic acid, maleic acid or anhydride, fumaric acid, crotonic acid, monoalkyl maleates, monoalkyl fumarates, monoalkyl itaconates and the like; acid substituted (meth)acrylates, such as for example, and sulfoethyl methacrylate; acid substituted (meth)acrylamides such as, for example, 2-acrylamido-2-methylpropylsulfonic acid; basic substituted (meth)acrylates and (meth)acrylamides, such as for example, amine-substituted methacrylates including dimethylaminoethyl methacrylate, tertiary-butylaminoethyl methacrylate and dimethylaminopropyl methacrylamide and the like; primary alkenes; long chain alkoxy- or alkylphenoxy(poly ethylene oxide) styrene, $\alpha$-methyl styrene, vinyltoluene, ethylene, vinyl esters of $C_2$–$C_{20}$ carboxylic acids, such vinyl acetate, vinyl 2-ethylhexanoate, vinyl neodecanoate and the like; vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate and the like.

The copolymers of the invention may be prepared by conventional aqueous emulsion polymerization techniques. The emulsifiers or dispersing agents employed for preparing the monomer emulsions or copolymer emulsions may be anionic, cationic or non-ionic types. Also a mixture of any two types may be used.

Suitable nonionic emulsifiers include, but are not limited to, ethoxylated octylphenols, ethoxylated nonylphenols, ethoxylated fatty alcohols and the like. Suitable anionic emulsifiers include, but are not limited to, sodium lauryl sulfate, sodium dodecylbenzene sulfonate, sulfated derivatives of nonylphenols, octylphenols and fatty alcohols, esterified sulfosuccinates and the like. Suitable cationic emulsifiers include, but are not limited to, laurylpyridinium chlorides, cetyldimethyl amine acetate, (C$_8$–C$_{18}$) alkyldimethylbenzylammonium chlorides and the like. The level of emulsifier may be from about 0.1% to about 10% by weight, based on total monomer charged.

A water-soluble free radical initiator is utilized in the aqueous emulsion polymerization. Suitable water-soluble free radical initiators include hydrogen peroxide; tert-butyl hydroperoxide; sodium, potassium, lithium and ammonium persulfate; and mixtures of such an initiator with a reducing agent, such as a bisulfite, including an alkali metal metabisulfite, hydrosulfite, and hyposulfite; and sodium formaldehyde sulfoxylate or a reducing sugar such as ascorbic acid, to form a redox system. The amount of initiator may be from 0.01% by weight to about 2% by weight of the monomer charged and in a redox system, a corresponding range of 0.01% by weight to about 2% by weight of reducing agent may be used.

The polymerization temperature may be in the range of about 10° C. to 100° C. In the case of the persulfate systems, the temperature is preferably in the range of 60° C. to 90° C. In the redox system, the temperature is preferably in the range of 20° C. to 70° C.

pH Adjustment

The pH of the resulting copolymer is adjusted to less than about 5, preferably to less than about 3.5. This adjustment may be accomplished in any of several different ways. The pH of the resulting copolymer may be affirmatively adjusted by adding a suitable acid, such as for example formic acid, acetic acid, nitric acid, sulfuric acid, phosphoric acid, benzoic acid, citric acid and the like. The pH may also be adjusted by incorporating into the copolymer from about 0.5% by weight to about 50% by weight of the total copolymer weight, of at least one acid-containing comonomer, such as a monoethylenically unsaturated monomer containing acid-functionality including (meth)acrylic acid, (meth)acryloxypropionic acid, itaconic acid, aconitic acid, maleic acid or anhydride, fumaric acid, crotonic acid, monoalkyl maleates, monoalkyl fumarates, monoalkyl itaconates and the like. In addition, the pH of the resulting copolymer may be adjusted to less than about pH 5 by controlling the reactants and additives used in the polymerization, including the initiators, such as sodium, potassium and ammonium persulfate, alkali metal bisulfites, hydrosulfites, sodium formaldehyde sulfoxylate, reducing sugars, such as ascorbic acid, and the like.

The emulsion copolymers of (meth)acrolein formed by the method of the present invention demonstrate performance properties equivalent to those formed by conventional polymerization techniques without the attendant safety and health concerns. As will be exemplified in the illustrative examples, the cling, block, tack, flex and solvent resistance of coatings containing emulsion copolymers of (meth)acrolein formed by the method of the present invention are equivalent to coatings containing emulsion copolymers of (meth)acrolein formed by conventional methods when used as a leather coating.

The following examples illustrate specific aspects and particular embodiments of the invention which, however, are not to be construed as limited thereby.

EXAMPLE 1

Synthesis of Latex

Preparation of Latex A

A 5 liter glass reactor, equipped with an agitator, a thermocouple for monitoring the temperature, a reflux condenser, an inlet for nitrogen and inlets for adding monomers and initiators, was charged with 1000 grams (g) of deionized water, 17.9 g of POlyStep TM B-5 (anionic surfactant from Stepan Company). The reactor was purged with nitrogen and heated to 60° C. A monomer pre-emulsion was prepared from 305 g deionized water, 17.9 g of Polystep B-5, 875 g of ethyl acrylate (EA), 110 g of acrylonitrile (AN), 10 g of acrylic acid (AA) and 10 g of 2-vinyl-1,3-dioxolane (2-VD). The monomer pre-emulsion and the initiators (2.0 g of ammonium persulfate in 105 g deionized water and 1.0 g of sodium bisulfite in 105 g of deionized water) were fed to the reactor over approximately 3 hours while maintaining the temperature at 60±2° C. After the additions had been completed, the contents of the reactor were gradually cooled. Four grams of tert-butyl hydroperoxide dissolved in 40 g of deionized water and 2 g of sodium formaldehyde sulfoxylate dissolved in 40 g of deionized water were added. After cooling to under 40° C., the pH was adjusted from about pH 3 to about pH 8 with triethylamine. Additional deionized water, approximately 100 g, was used for rinsing of reactants. The resulting latex had a solids content of 36.5 percent by weight, a pH of 8.1, and a viscosity of 15 centipoises (cps).

Synthesis of Latex B

Latex B was prepared according to the procedure used for Latex A, except that the pre-emulsion was prepared from 870 g of EA, 110 g of AN, 10 g of AA and 20 g of 2-VD. The resulting latex had a solids content of 35.7 percent by weight, a pH of 7.7, and a viscosity of 19 cps.

Synthesis of Latex C

Latex C was prepared according to the procedure used for Latex A, except that the pre-emulsion was prepared from 865 g of EA, 110 g of AN, 10 g of AA and 30 g of 2-VD. The resulting latex had a solids content of 36.3 percent by weight, a pH of 7.6, and a viscosity of 17 cps.

Synthesis of Latex D (Comparative)

Latex D was prepared according to the procedure used for Latex A except that the pre-emulsion was prepared from 870 g of EA, 110 g of AN, 10 g of AA and 10 g of acrolein. The resulting latex had a solids content of 35.9 percent by weight, a pH of 8.0, and a viscosity of 18 cps.

Synthesis of Latex E (Comparative)

Latex E was prepared according to the procedure used for Latex A, except that the pre-emulsion contained 878 g of EA, 110 g of AN and 12 g of AA. The resulting latex had a solids content of 36.5 percent by weight, a pH of 7.7, and a viscosity of 18 cps.

EXAMPLE 2

Preparation of Leather Basecoats—Testing for Block and Flex Resistance

This example illustrates the use of latices from Example 1 to formulate a typical leather basecoat for application to corrected grain leather. The basecoats were formulated as follows (all weights are in grams).

| Basecoat Formulation | F | G | H | I | J |
|---|---|---|---|---|---|
| Water | 147 | 139 | 144 | 139 | 147 |
| Primal TM Penetrator 2030 | 30 | 30 | 30 | 30 | 30 |
| Latex A | 473 | — | — | — | — |
| Latex B | — | 481 | — | — | — |
| Latex C | — | — | 476 | — | — |
| Latex D | — | — | — | 481 | — |
| Latex E | — | — | — | — | 473 |
| Primal TM Dull 140 | 100 | 100 | 100 | 100 | 100 |
| P-4884 | 250 | 250 | 250 | 250 | 250 |
| Acrysol TM RM-1020 | 16 | 16 | 16 | 16 | 16 |

Primal Penetrator 2030, available from Rohm and Haas.
Primal Dull 140, a dulling agent available from Rohm and Haas P-4884, ocher yellow pigment dispersion available from Stahl, USA.
Acrysol RM-1020, a thickening agent, available from Rohm and Haas.

The basecoats were applied to corrected grain upholstery leather using the following finishing sequence:
1. Spray two coats to a total coverage of 3.0 g finish solids per square foot.
2. Dry at 120° F. for 30 minutes.
3. Plate the basecoat using a Regular Haircell print at 170° F., 25 tons force, 2 seconds dwell.

After application of the basecoat, the leather was rated for block resistance on pieces placed finish to finish for 1 hour at 150° F. and under 2 pounds per square inch pressure, and also for resistance to finish cracking under flexing using a Bally Flexometer after 40,000 flex cycles. The formulations prepared with copolymers containing 2-VD (Formulations F-H) are seen to have improved block and flex resistance compared to comparative Basecoat Formulation J, prepared with a copolymer containing neither 2-VD nor acrolein, and to match or exceed the block and flex resistance of comparative Basecoat Formulation I, prepared from a copolymer containing acrolein.

| Basecoat Formulation | F | G | H | I | J |
|---|---|---|---|---|---|
| Block resistance | poor | fair | good | poor | poor |
| Bally Flex Resistance | | | | | |
| 40,000 cycles, wet | very good | excellent | excellent | excellent | good |
| 40,000 cycles, dry | very good | excellent | good | excellent | good |

Block resistance and flex resistance are rated subjectively on a scale from poor < fair < good < very good < excellent.

EXAMPLE 3

Preparation of Leather Basecoats—Testing for Cling, Block, Tack and Solvent Resistance This example illustrates the use of latices from Example 1 to formulate a typical leather basecoat for application to split leather. The basecoats were formulated as follows (all weights are in grams).

| Basecoat Formulation | K | L | M | N | O |
|---|---|---|---|---|---|
| MK-1 | 3.3 | 3.3 | 3.3 | 3.3 | 3.3 |
| LA Neutral | 50.0 | 50.0 | 50.1 | 50.0 | 50.0 |
| C-7 | 18.0 | 17.2 | 17.4 | 17.2 | 17.1 |
| Latex A | 191.3 | — | — | — | — |
| Latex B | — | 196.0 | — | — | — |
| Latex C | — | — | 192.1 | — | — |
| Latex D | — | — | — | 195.0 | — |
| Latex E | — | — | — | — | 191.0 |
| P-4886 | 83.3 | 83.4 | 83.4 | 83.3 | 83.3 |
| RM-1020/H2O 1:1 | — | 2.1 | — | — | 0.5 |

Primal TM Leveler MK-1, a leveling agent available from Rohm and Haas.
Primal LA Neutral, a colorless pigment available from Rohm and Haas.
Primal Binder C-7, a wax available from Rohm and Haas.
P-4886 = Oxide Red pigment dispersion available from Stahl, USA.
Acrysol TM RM-1020, a thickening agent, available from Rohm and Haas.

The basecoats were applied to split leather using the following sequence:
1. Spray the basecoat onto leather to a total add-on of 43 g wet finish per square foot of leather.
2. Dry at 120° F. for 1 hour.
3. Plate using a Coarse Haircell print at 180° F., 50 tons pressure, 2 seconds dwell.

The basecoats were rated for plate cling, hot tack after plating, block resistance on pieces placed finish to finish at 140° F. for 1 hour under 1 kilogram per square inch pressure, resistance to finish cracking under flexing using a Bally Flexometer after 10,000 flex cycles, and resistance to Veslic solvent rubs using acetone and toluene. The solvent rub test was performed by applying either 25 drops of acetone or 30 drops of toluene to the flesh side of the finished leather. After allowing the solvent to penetrate for 1 minute in the case of acetone, or 5 minutes in the case of toluene, the finish was abraded with a dry Veslic pad under a 1 kilogram weight. Veslic cycles were measured to the appearance of damage to the finish.

The formulations prepared with copolymers containing 2-VD (Formulations K-M) are seen to have improved plate cling, hot tack, block resistance, solvent resistance and Bally flex resistance compared to comparative Basecoat Formulation O, prepared with a copolymer containing neither 2-VD nor acrolein, and to match or exceed the plate cling, hot tack, block resistance, solvent resistance and Bally flex resistance of comparative Basecoat Formulation N, prepared from a copolymer containing acrolein.

| Basecoat Formulation | K | L | M | N | O |
|---|---|---|---|---|---|
| Plate Cling | slight | none | none | very slight | slight-moderate |
| Hot Tack | slight | none | none | none | slight-moderate |
| Block Resistance | slight-moderate | slight | very slight | moderate | moderate-severe |
| Veslic (cycles to finish damage) | | | | | |
| acetone | 7 | >10 | >10 | >10 | 1 |
| toluene | 25 | >50 | >50 | >50 | 8 |
| Bally Flex Resistance | | | | | |
| 10,000 cycles, wet | slight | very | none | none | severe |

-continued

| Basecoat Formulation | K | L | M | N | O |
|---|---|---|---|---|---|
| | | slight | | | |

Plate Cling, Hot Tack and Block Resistance were rated subjectively from none (best) > very slight > slight > moderate > severe (worst).
Solvent resistance was rated on the number of Veslic cycles to the appearance of damage to the finish (more cycles = better solvent resistance).
Bally Flex Resistance measured the number of cracks in the finish after subjecting pieces of wet leather to 10,000 flex cycles. None (best) > very slight > slight > moderate > severe.

We claim:

1. A method for forming emulsion copolymers of (meth)acrolein comprising the steps of:
    (a) emulsion polymerizing a copolymer from about 0.1% to about 25%, by weight, based on the total weight of the copolymer, of an acetal derivative of (meth)acrolein with from about 75% to about 99.9% by weight, based on the total weight of the copolymer, of at least one $\alpha,\beta$-ethylenically unsaturated comonomer; and
    (2) adjusting the pH of said copolymer to less than about 5 to hydrolyze said acetal derivative of (meth)acrolein to (meth)acrolein.

2. The method of claim 1 wherein said acetal derivative of (meth)acrolein is a monomer selected from the group consisting of 2-vinyl-1,3-dioxolane, 2-vinyl-4-methyl-1,3 dioxolane, 3,3-dimethoxy-1-propene, 3,3-diethoxy-1-propene, 3,3-diethoxy-2-methyl-1-propene, 2-isopropenyl-1,3-dioxolane and 2-isopropenyl-4-methyl-1,3-dioxolane.

3. The method of claim 1 wherein said acetal of (meth)acrolein is 2-vinyl-1,3 dioxolane.

* * * * *